Aug. 6, 1935.  J. H. HUMBERSTONE  2,010,721
WELDING ELECTRODE
Filed Feb. 27, 1934
Inventor:
Joseph H. Humberstone
by Harry E. Dunham
His Attorney.

Patented Aug. 6, 1935

2,010,721

UNITED STATES PATENT OFFICE 2,010,721

WELDING ELECTRODE

Joseph H. Humberstone, Schenectady, N. Y., assignor to General Electric Company, a corporation of New York Application February 27, 1934, Serial No. 713,075

3 Claims. (Cl. 219—8)

My invention relates to electrodes for use in metallic arc welding.

In metallic arc welding an arc is maintained between the work to be welded and a rod, wire or strip of metal, usually referred to as an electrode. During welding the electrode is fused or vaporized, or both, and the metal thereof deposited upon and welded to the work as the electrode is fed toward the work to maintain the arc.

The quality of the metal deposited by such a process depends to a large extent upon the influence of certain elements or compounds associated with the electrode, usually in the form of a coating. Electrodes so coated are commonly referred to as flux coated electrodes.

It is an object of my invention to provide an improved flux coated electrode.

It is a further object of my invention to provide an electrode that is suitable for vertical and overhead welding but which may also be used for flat or horizontal welding.

It is a further object of my invention to provide a flux coating for welding electrodes which will adequately protect the weld metal during the process of welding and which may readily be removed from the finished weld after the welding operation has been completed.

It is a further object of my invention to provide an electrode the surface coating of which is positively bound to the electrode.

Further objects of my invention will appear from the following description taken in connection with the accompanying drawing which illustrates one embodiment thereof.

The electrode illustrated in the drawing comprises a metallic core 1 having a flux coating 2 of substantially the following composition:

| | |
|---|---|
| Feldspar | 1 part by weight |
| Titanium dioxide | 1 part by weight |
| Sodium silicate (liquid) | 2 parts by weight |
| Carbon | ½ to 2% of the total weight of the above ingredients |

This flux is shown as applied to the core of the electrode in conjunction with a coating of fibrous material which is impregnated therewith. The fibrous material may form a tape which is folded longitudinally about the core of the electrode with its edges abutting one another and parallel to the axis thereof as described and claimed in my copending application Serial No. 648,651, filed December 23, 1932, for Welding electrodes and assigned to the same assignee as the present application. It is also preferable to apply the tape to the core of the electrode so as to obtain a substantial layer of flux between the tape and the core of the electrode.

I prefer to employ a flux of the following composition:

| | Parts by weight |
|---|---|
| Feldspar | 22.52 |
| Titanium dioxide | 22.52 |
| Petroleum coke | .89 |
| Sodium silicate (liquid) | 45.05 |
| Water | 9.01 |

The sodium silicate preferably has a specific gravity of 40° Baumé in which the $Na_2O$ and $SiO_2$ are present in the approximate ratio of 1 to 3.25. The feldspar, titanium dioxide and carbon are finely ground before being mixed into a paste with the sodium silicate and water. Best results are obtained when the carbon is granular, although it is possible to use an amorphous carbon, such as lamp black.

The equal proportions of titanium dioxide and feldspar are important and characterize an electrode made in accordance with my invention. The slag resulting from feldspar alone being very viscous and of a vitreous nature will not flow readily over the weld and cover it. The addition of titanium dioxide thereto, however, renders the slag more fluid changing it from a vitreous state to a crystalline state thereby causing it to spread over the surface of the weld giving adequate protection to the weld metal and leaving a smooth surface after the slag is removed. The combination of titanium dioxide and feldspar in equal proportions gives a slag particularly suitable for covering vertical and overhead welds. The small percentage of carbon is also important in that it reduces the fluidity of the weld metal and thus adapts an electrode coated with a flux of the above composition for vertical and overhead welding.

When my flux is used with a cellulosic material, such as a cotton tape, the weight of the flux and cotton applied to the electrode should be about 10% of the weight of the core of the electrode, although satisfactory operation may be obtained by employing flux coating constituting a greater or less percentage of the weight of the core of the electrode.

My electrode works best with straight polarity, that is, connected to the negative terminal of a source of direct current supply. It may, however, be used with reversed polarity. It also operates satisfactorily when connected to an alternating current source of supply. The arcing voltage ranges from 20 to 24 volts.

The following results are obtained when welding steel boiler plate of fire-box quality with an electrode coated with my flux and having substantially the following composition:

|  | Per cent |
|---|---|
| Carbon | .13 to .18 |
| Manganese | .40 to .60 |
| Phosphorus | maximum .04 |
| Sulphur | maximum .04 |
| Silicon | maximum .025 |
| Iron—remainder | |

Welds made with such an electrode have a tensile strength of from 60,000 to 67,000 pounds per square inch. The weld metal is ductile having an elongation as determined by the free-bend test of from 20 to 36 per cent and under the Charpy impact test gives from 24 to 28 foot pounds.

The flux coating of my electrode is a particular development of the flux described and claimed in United States Letters Patent 1,992,792, James M. Weed, granted February 26, 1935 on an application, Serial No. 589,386, filed January 28, 1932, for Welding electrodes, and assigned to the same assignee as the present application. The constituents of my flux have been selected and proportioned to obtain an electrode particularly adapted for vertical and overhead welding.

When my fluxing material is applied to the core of the electrode as described in my above referred to copending application, I find it desirable to apply to the exterior surface of the electrode a flat helical binding 3 to hold the tape in position on the wire. This prevents the seam formed by the abutting edges of the tape from opening when the flux impregnated tape dries. This binding also serves to hold the flux impregnated fibrous material on the electrode if the coating becomes moist or wet due to exposure in shipping or prior to use. The helical binding is made flat in order to decrease the external diameter of the electrode and to prevent it from being dislodged from the surface of the electrode through rubbing action. The binding illustrated in the drawing comprises a plurality of parallel strands of thread. The turns of the helical binding may be spaced a substantial distance from one another without losing the desired binding action furnished thereby and this spacing is preferred in order to increase the speed of manufacturing the electrode. The flux composition of the electrode or the material of the core thereof may be indicated by suitably coloring the helical binding. For example, a welding rod having the flux composition above described may be identified by a red binding cord.

The electrode illustrated in the drawing is a short length electrode such as would ordinarily be employed in hand welding operations. The upper end of the electrode has been bared of flux in order to adapt it for use in a suitable electrode holder by means of which current is supplied thereto. Electrodes may be manufactured in long lengths for use in automatic or semi-automatic welding machines. In automatic arc welding machines the electrode is fed toward and away from the work to strike and thereafter maintain a welding arc by means of a mechanism which functions and responds to a characteristic of the welding arc, such as its voltage or current. In such automatic machines current may be fed to the electrode through incisions made in the flux coating or through openings provided by removing a portion of the coating from the electrode.

What I claim as new and desire to secure by Letters Patent of the United States is:

1. A flux for use in arc welding having substantially the following composition: feldspar one part by weight, titanium dioxide one part by weight, liquid sodium silicate two parts by weight, and carbon one-half to two per cent of the total weight of the preceding ingredients.

2. A welding electrode having a covering resulting from impregnating a cellulosic material with a flux of substantially the following composition: feldspar one part by weight, titanium dioxide one part by weight, liquid sodium silicate two parts by weight, and carbon one per cent of the total weight of the preceding ingredients.

3. A welding electrode having a covering of flux impregnated fibrous material to the exterior surface of which is applied a flat helical binding of a fibrous material the turns of which are spaced a substantial distance from one another.

JOSEPH H. HUMBERSTONE.